Oct. 25, 1966  A. J. PALFEY ETAL  3,280,522
BUILDING PANELS AND FASTENER MEANS THEREFOR
Filed Sept. 16, 1963  2 Sheets-Sheet 1
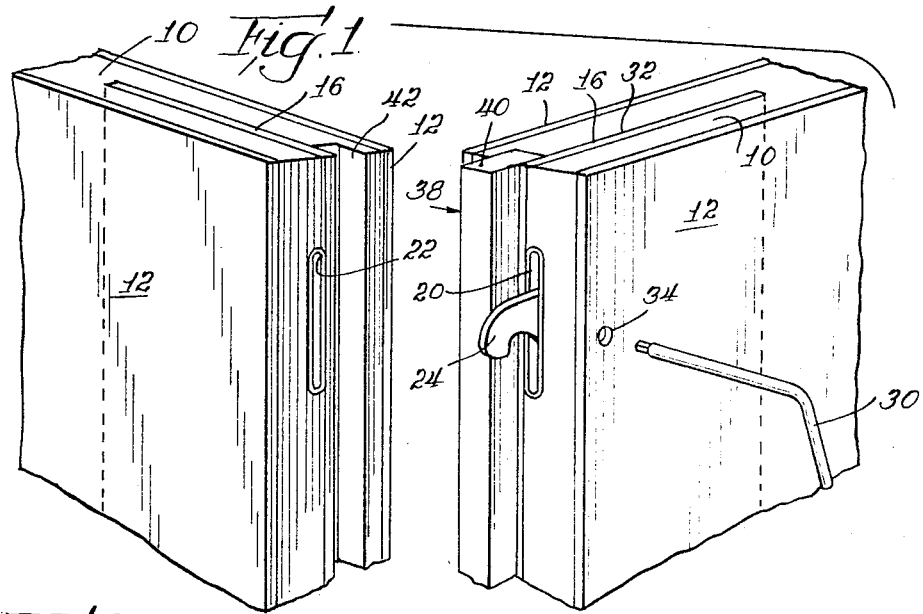
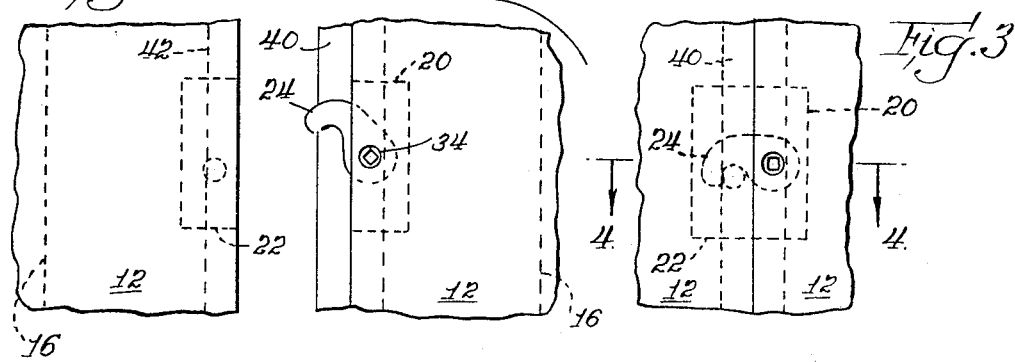
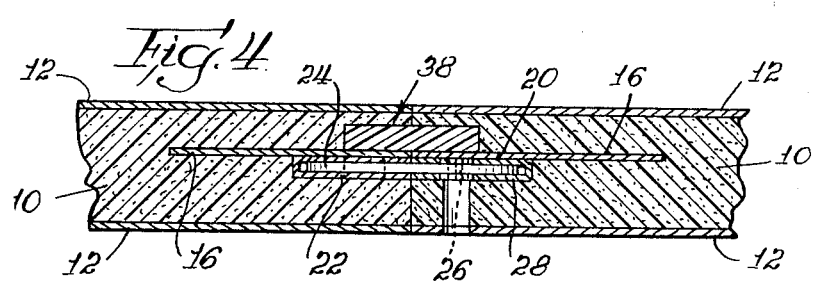
Inventors
Albert J. Palfey
and Louis W. Card
By Dominick, Rudy & Stein
Jerome Rudy  Att'ys

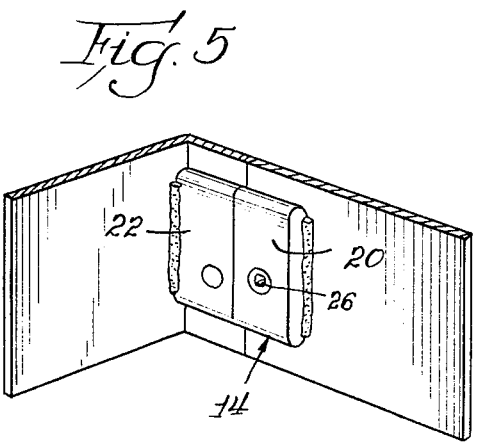
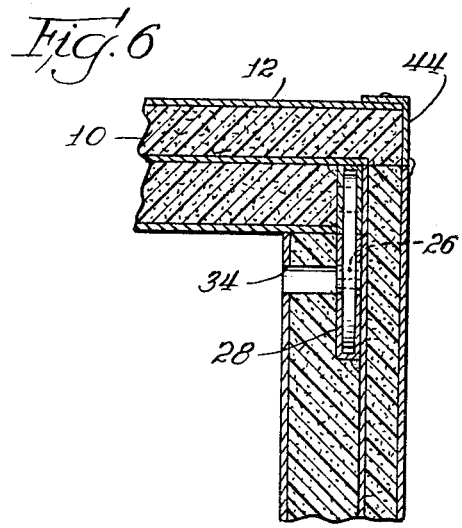
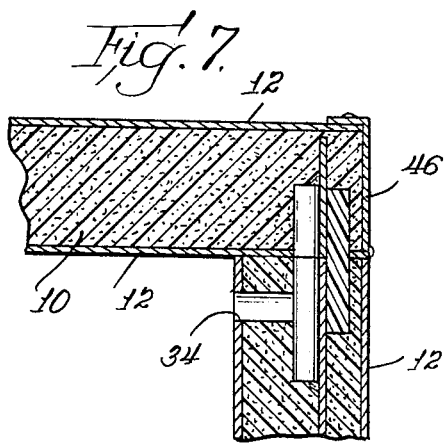
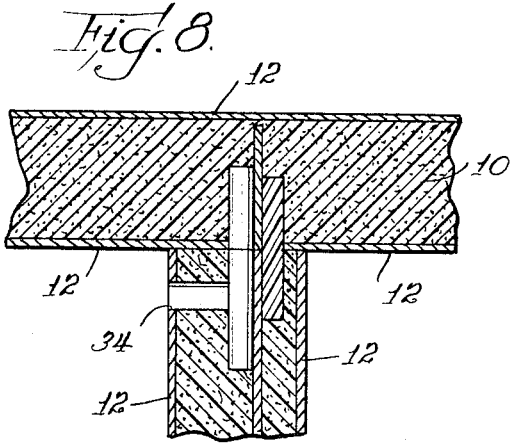
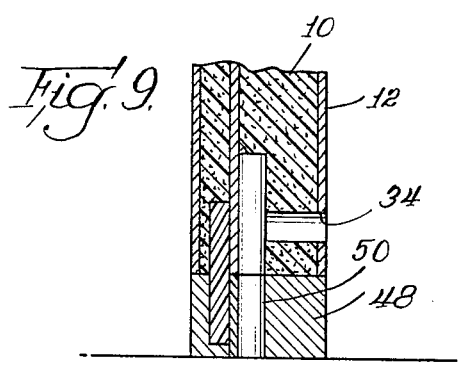

United States Patent Office 3,280,522
Patented Oct. 25, 1966

3,280,522
BUILDING PANELS AND FASTENER MEANS THEREFOR
Albert J. Palfey and Louis W. Card, Midland, Mich., assignors to The Dow Chemical Company, Midland, Mich., a corporation of Delaware
Filed Sept. 16, 1963, Ser. No. 309,214
2 Claims. (Cl. 52—127)

This invention relates to building panels and to unique means for joining said panels. More particularly, this invention relates to building panels of sandwich construction and to panel fastener means which are easily affixed to said panels after the latter are cut into the desired dimension for use in a building structure.

Laminated building panels have recently become extremely popular. Usually, such panels have an inner insulating and/or sound absorbing core with an outer facing of wood, metal, plastic or combinations thereof. These panels are customarily made in standard sizes, generally 4' by 8', and usually contain means wherein two or more panels may be joined together to form a wall, a ceiling, or a partition.

The joining means generally comprise fasteners of various design, which are pinned to the frame of the panel or to the face of the panel prior to actual formation of the laminated core-facing structure. The core consists of a material which is foamed in place by the application of heat or catalysts such as expandable polystyrene, urethane, ethylcellulose, polyethylene or the like.

While these panels have been heartily accepted by the trade, certain wants still exist. For example, where smaller sizes than 4' by 8' or sizes other than stock sizes are needed, custom manufacture is necessary. Or else, the stock size panel must be cut and then joined to other panels or the existing building structure. In such instance, custom joints or else complicated fastening techniques must be applied. Even where the stock size is useful, field erection is tedious and time consuming. And although the use of integral panel fasteners embedded or affixed to the panel cuts down on field erection time, the method needed to operate such integral fasteners is frequently difficult to understand, or else a weak, or unsightly joint results.

An object of this invention is to provide a novel building panel.

Another object is to provide a unique fastener means for joining building panels together or to existing structures.

Still another object is to provide a panel fastener means which does not require a specific panel structure for affixation thereto.

A further object is to provide a panel fastener means which does not require pinning or wood framing for support.

A still further object is to provide a panel fastener means which can be easily applied to panels either in the factory or in the field with relatively little skill.

Another object is to provide a panel fastener means which may universally be used for butt joints, corner joints, lap joints, and T joints.

Another object is to provide a panel fastener means which reduces field erection time.

Another object is to provide a panel fastener means which is universally applicable to laminated panels regardless of its facing or core structure.

Another object is to provide a panel fastener means which is simple to operate.

Another object is to provide a panel fastener means which is sturdy.

Another object is to provide a panel fastener means which is relatively low in cost.

Another object is to provide a panel fastener means which is substantially hidden from view after a plurality of panels are joined together.

Another object is to provide building panels which, after joining, are attractive as an assembled structure due to the unique fastener means employed.

Other objects of the invention will in part be obvious and will in part appear hereinafter.

The invention accordingly comprises the features of construction, combination of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings; in which:

FIG. 1 is a perspective view of two panels about to be joined in butt relationship.

FIG. 2 is a detailed side elevational view of the fastener means, in unlocked condition, of the panels of FIG. 1.

FIG. 3 shows the fastener means in locked condition.

FIG. 4 is a top cross-sectional view of the panels of FIG. 1 after being joined.

FIG. 5 is a perspective view of the fastener means adapted for a lap corner joint.

FIG. 6 is a top cross-sectional view of the fastener means of FIG. 5 when used to join two building panels in lap corner relationship.

FIG. 7 is a top cross-sectional view of two panels and their fastening means joined in a butt corner relationship.

FIG. 8 is a top cross-sectional view of two panels and their fastening means joined in a T-joint relationship.

FIG. 9 is a side cross-sectional view of a panel and a fastening means joined to a floor plate in a floor-joint relationship.

Similar reference characters refer to similar parts throughout the several views of the drawings.

The novel building panel and fastener means therefor of this invention broadly comprises a laminated core and facing panel with fastening means secured to a web which has been embedded into the core.

More particularly, as seen in FIG. 1, the novel building panel and fastener means comprises a core 10 of insulating and/or sound absorbent material such as expanded polystyrene, urethane, ethylcellulose, or polyethylene, with a facial layer 12 on each side of wood, metal, or plastic. The panel fastener means comprises one or more locks 14, preferably cam locks, affixed to a ribbon-like web 16 of metal or plastic. The web is embedded, knife-edge like, into the core material and adhesively secured thereto. Key hole 34 extends laterally therefrom but is of such small dimension that it is almost invisible (see FIG. 1) after joining the panel to a next adjacent panel or to an existing building structure.

The invention will now be described in detail.

The building panel, as seen edgewise in FIG. 1, is of customary laminated design, in that it has an inner core formed of an insulating and/or sound absorbent material with protective facial layers 12 on each side of the core. The facial layers 12 are bonded to the core with an adhesive, by heat sealing or similar affixation means. The face layers may also be positioned at a spaced relationship and an expandable plastic substance inserted into the space. Subsequently the substance is expanded, by heat, by catalytic action or the like to produce a laminated panel. The expandable substance may be polystyrene, polyurethane, polyethylene, ethylcellulose or the like.

It should be noted that the panel shown does not have a framing or a jig means within its structure for supporting the fastener means. The raw edge of the core is always visible, prior to assembly into a structure. It is this feature which expands the utility of the panel, as will be seen later.

The fastener means as best seen in FIG. 5 comprises a lock 14 consisting of two parts, one the latch mechanism 20 and the other, the lock plate 22. Although any latch mechanism may be used, the one preferred has a rotatable bolt 24 (see FIGS. 2 and 3) mounted upon a key shaft 26 which is journaled to and rotates within the latch mechanism housing 28. It is operable by insertion of key 30 from outside of the panel.

In the usual situation a plurality of locks are used for joining two panels together. The latch mechanism housing 28 of each lock is secured to a single web 16. Likewise, the lock plates 22 of said locks are affixed to another common web 16. The web is preferably sheet metal, such as aluminum, or sheet steel, approximately 16 gauge; however other web material, such as plastic may be used.

The web containing the latch mechanism of locks 14 is embedded into the edge of core 10 of one panel by the simple routing of an appropriate size channel in the edge and then inserting the web therein with adhesive, such as epoxy resin, to seal the web within the core. A key hole 34 for each lock is drilled through one of the face layers 12 and part of the core.

For improving the efficiency of the insulation and/or sound deadening characteristics of the panels after assembly into a building structure, it is frequently desirable to incorporate a spline arrangement which consists of a tongue 40 and groove 42 respectively in the two joined panels. Such a spline arrangement may be easily made by routing a tongue receiving channel into the edge of the core of one panel and inserting a tongue 40 therein with adhesive. The groove 42 is routed into the edge of the other panel.

The web 16, as seen in FIG. 5, may have an angular configuration for forming a lap corner joint. As evident from FIG. 6, such angular configuration provides added support to the joint. A cover plate 44 may, in such instance, be used to cover the exposed portions of the core after assembly.

FIG. 7 illustrates an ordinary corner joint which does not utilize a lap arrangement. As illustrated, web 16, affixed to the lock plate 22, is inserted laterally into the core after the face layer has been stripped back a sufficient distance, from one edge of the panel. A cover plate 46, which may comprise a rigid metallic structure or a tape matching the ornamentation of face 12 is used to cover the exposed portion of the core after assembly.

FIG. 8 illustrates a partition or T-joint wherein web 16 affixed to the lock plate 22 is similarly inserted laterally into the core after a portion of the face layer 12 has been cut away.

FIG. 9 illustrates a floor joint wherein web 16 of the latch mechanism 20 is inserted into the edge of the panel to be secured to the floor plate 48. Prior to securing a floor plate 48 to the floor by bolting, nailing or the like, the web of the lock plate 22 is inserted into a channel 50 routed in the upside of the plate. The panel is then simply affixed to the floor plate by the use of key 30.

As should be evident from the various figures the fastening means herein is useful for a variety of joints.

And these basic butt, lap and T-joints may be used to form a complete building structure. Lap joints are preferably used in all vertical and horizontal 90° corners, and butt joints preferably with a spline arrangement, on all parallel panel structural assemblies. T-joints are used for partition wall and wall to floor joints.

To determine the strength of such joints, metal embedded test specimens of various sizes were made and tested.

Pieces of 4″ and 2″ Styrofoam* core sandwich panels were used. Webs of 0.064″ aluminum were imbedded on the neutral axis of the sandwich, parallel with the facings. Bonds were made with epoxy resin thickened about 0.5% by weight of Cab-O-Sil*.

Five of each type specimens were made. Pull tests were run on a laboratory Instron tensile tester at a cross-head speed of 0.05″/min. Results are tabulated below.

TABLE I

| Panel thickness, inch | 2 | 4 | 4 | 4 | 4 |
|---|---|---|---|---|---|
| Styrofoam grade | (1) | (1) | (2) | (2) | (2) |
| Metal web width, inch | 6 | 6 | 3 | 6 | 12 |
| Metal web depth, inch | 2 | 2 | 4 | 2 | 1 |
| Metal web area, (sq. in.) | 12 | 12 | 12 | 12 | 12 |
| Breaking load,[3] lbs | 825 | 670 | 513 | 558 | 855 |
| Load/web area, p.s.i | 69 | 56 | 44 | 47 | 71 |
| Eq. single shear, p.s.i | 35 | 28 | 22 | 24 | 36 |

[1] Insulation.
[2] Construction.
[3] Avg. of 5 specimens.

Results show a variation in the type of Styrofoam and the depth-width relationship of the embedded web. Also the narrower panel has greater holding strength.

Test results indicate a wider web has greater holding or clamping strength and a greater width than depth dimension simplifies installation and adhesive bonding.

The fastener means should be as thin as possible and should preferably be located parallel to the facings to minimize heat transfer.

From the test results above, it should be evident that the shear properties of Styrofoam are adequate to support fastening devices. The same applies to other core material.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Now that the invention has been described, what we claim as new and desire to secure by Letters Patent is:

1. A laminated building panel having a core of foam plastic and two facial layers, one on each side of said core, laminated thereto, said core being exposed at the edges of said panel so that the raw edge is visible and having an open-faced slot in such raw edge which is substantially thin with respect to the thickness of said panel, and panel fastener means within said slot, said means comprising a thin sheet-like web and at least one element of the lock secured thereto, said web having a thickness substantially equal to said slot and extending a substantial distance beyond the periphery of said element of the lock and being embedded in said slot and fixedly secured by an adhesive on each side to said core, and a keyhole for said lock element extending transversely through said core to said lock element, a groove adjacent said panel fastener means and a tongue within said groove extending beyond the edge of said panel, said core capable of being formed with a slot and a groove and said panel fastener means and said tongue capable of being embedded in said slot and said groove respectively either in the factory

*Trademark.

or in the field thereby permitting panels to be cut to size and affixed with panel fastener means at either location.

2. The building panel of claim 1 wherein said web has a greater width than slot depth dimension whereby installation and adhesive bonding is simplified.

References Cited by the Examiner
UNITED STATES PATENTS

| | | | |
|---|---|---|---|
| 2,962,323 | 11/1960 | McBride | 52—309 |
| 2,978,758 | 4/1961 | Dunn | 52—309 |
| 2,980,972 | 4/1961 | Kloote et al. | 52—309 |
| 3,003,810 | 11/1961 | Kloote et al. | 52—309 |
| 3,143,730 | 7/1962 | Adie | 52—309 |
| 3,145,504 | 8/1964 | Dunnington | 52—309 |

FOREIGN PATENTS 563,849  9/1958  Canada.

FRANK L. ABBOTT, *Primary Examiner.*

R. A. STENZEL, *Assistant Examiner.*